United States Patent [19]
Anderson

[11] 4,397,491
[45] Aug. 9, 1983

[54] PORTABLE VACUUM OBJECT HANDLING DEVICE

[76] Inventor: Gordon H. Anderson, Los Alamos, N. Mex., granted to U.S. Department of Energy under the provisions of 42 U.S.C. 2182

[21] Appl. No.: 288,561

[22] Filed: Jul. 30, 1981

[51] Int. Cl.³ .................................................. B66C 1/02
[52] U.S. Cl. .................................. 294/64 R; 294/131
[58] Field of Search ..................... 294/64 R, 65, 86 A, 294/131; 248/362, 363; 269/21; 279/3

[56] References Cited

U.S. PATENT DOCUMENTS

| | | | |
|---|---|---|---|
| 897,060 | 8/1908 | Cash | 294/64 R |
| 1,024,286 | 4/1912 | Santilli | 294/64 R X |
| 2,274,304 | 2/1942 | Perry | 294/64 R X |
| 2,558,479 | 6/1951 | Miller | 294/64 R X |
| 2,694,330 | 11/1954 | Davies et al. | 294/131 X |
| 3,240,525 | 3/1966 | Wood | 294/64 R |
| 3,347,327 | 10/1967 | Engelen et al. | 294/64 R X |
| 3,677,598 | 7/1972 | Becker | 294/64 R |
| 3,721,465 | 3/1973 | Kraissl | 294/64 R |
| 4,265,476 | 5/1981 | Elgart | 294/64 R |

Primary Examiner—Johnny D. Cherry
Attorney, Agent, or Firm—Robert W. Weig; Paul D. Gaetjens; Richard G. Besha

[57] ABSTRACT

The disclosure relates to a portable device adapted to handle objects which are not to be touched by hand. A piston and bore wall form a vacuum chamber communicating with an adaptor sealably engageable with an object to be lifted. The piston is manually moved and set to establish vacuum. A valve is manually actuatable to apply the vacuum to lift the object.

3 Claims, 1 Drawing Figure

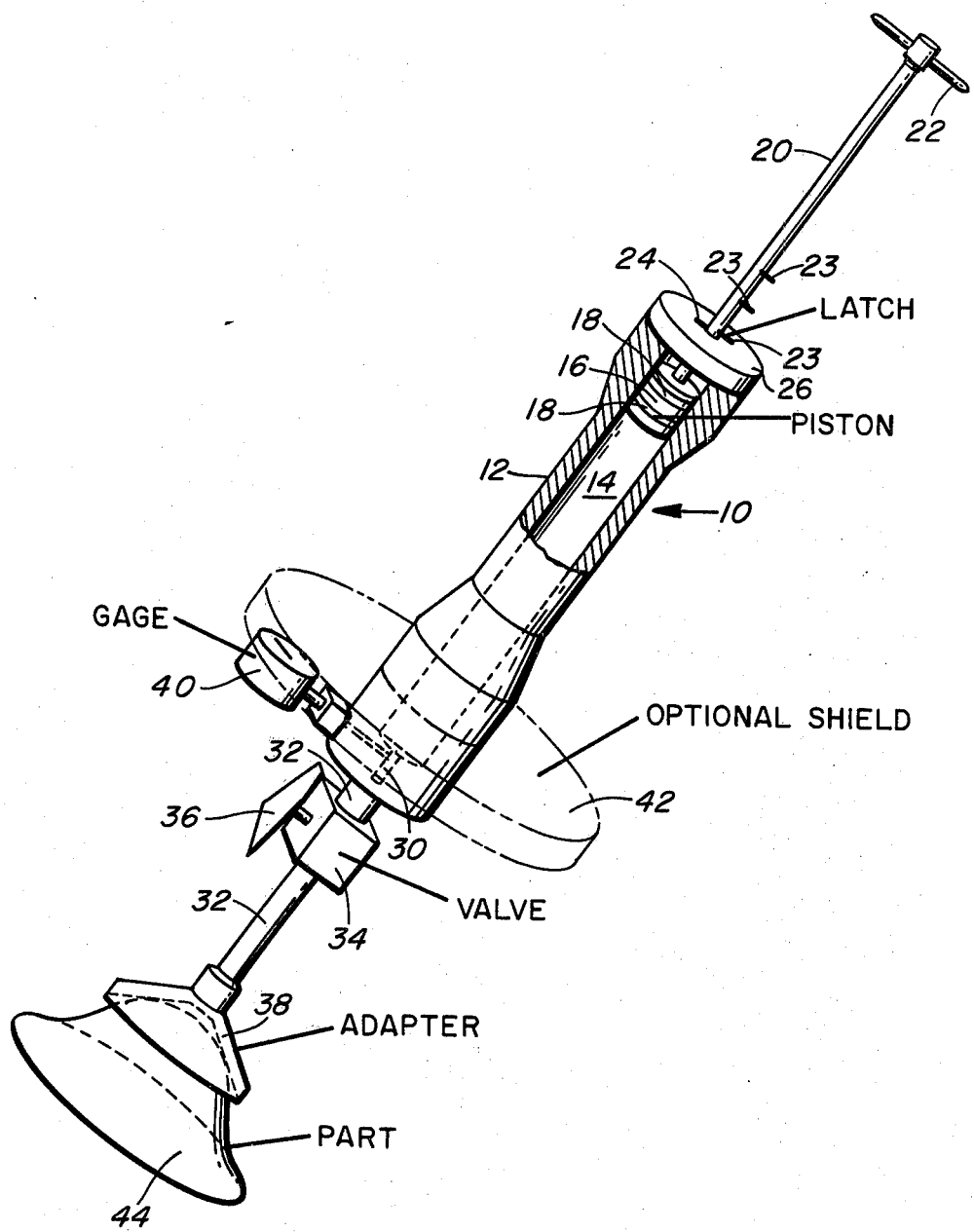
Fig.

PORTABLE VACUUM OBJECT HANDLING DEVICE

This invention is the result of a contract with the Department of Energy (Contract No. W-7405-ENG-36).

BACKGROUND OF THE INVENTION

The invention relates to devices for handling objects such as by lifting them, moving them and positioning them without a user's hand contact and more particularly to an apparatus utilizing a vacuum to hold an object to be positioned, moved or otherwise handled.

It may be desirable to pick up, move, relocate or adjust the position of objects without physically touching them with one's hands. Such a situation could be precipitated by a need to preserve cleanliness, by hazardous conditions such as a radioactive environment, by the inability of a person to grip the object due to its geometry or because of its surroundings, or by circumstances which prohibit a person from getting close enough to an object to handle it in a practical manner.

In particular, it is extremely difficult to handle radioactive material in a glove box environment. A device for handling radioactive material in a glove box environment is desirable. Such a device should be portable, self-contained and capable of safely lifting up to six kilograms of material. It should also be relatively easy to use.

One object of the present invention is to provide a portable hand-held device for handling objects.

Another object of the invention is to provide a device for handling radioactive materials manually.

Another object of the invention is to provide a relatively maintenance free, simple to operate device for handling objects not to be touched by human hands.

One advantage of the instant invention is that in accordance therewith objects can be handled relatively easily without contact with the hands.

Another advantage of the instant invention is that a device in accordance therewith is simple, easy to use and relatively maintenance free.

Another advantage of the instant invention is that radioactive materials can be handled without contact by hand.

Yet another advantage of the invention is that a shield may be incorporated onto a device in accordance therewith to provide additional protection from handled radioactive objects.

SUMMARY OF THE INVENTION

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, this invention may comprise a portable vacuum holding apparatus comprising an elongated housing having a generally cylindrical bore wall longitudinally disposed therein and a piston sealably slidably engageable with said bore wall and disposed therein to form a vacuum chamber. The piston may be reciprocated within the bore wall manually and is lockable in at least one position. A piece engaging member is attached to the piston housing and communicates with the vacuum chamber. The member comprises a conduit relatively small in diameter compared to the bore wall and preferably holds an adaptor sealably fittable to an object to be handled. A valve is operably connected to the member for opening and closing the conduit thereof. A vacuum gage may be provided as well as a radiation shield if the device is to be used in a radioactive environment or to handle radioactive material. Other types of shielding may be provided as desired.

BRIEF DESCRIPTION OF THE DRAWINGS

The accompanying drawing, which is incorporated in and forms a part of the specification, illustrates an embodiment of the present invention and, together with the description, serves to explain the principles of the invention. In the drawing:

The FIGURE illustrates a preferred embodiment of the invention.

DETAILED DESCRIPTION OF A PREFERRED EMBODIMENT OF THE INVENTION

Reference is now made to the FIGURE which shows a portable vacuum handling device 10 comprising an elongated housing 12 containing a generally cylindrical bore having bore wall 14 longitudinally disposed within the housing. In the preferred embodiment the housing 12 is adapted to be hand held and to comfortably fit a user's hand. A piston 16, having O-ring seals 18, sealably slidably engages bore wall 14. The piston is manually moveable with a rod 20 which in the preferred embodiment has a small handle 22 affixed thereon. Rod 20 is detainable in at least one position by a latch pin 23 affixed to rod 20 which passes through a slot 24 in cylinder cap 26. The latch pin is engaged with the top of cap 26 by rotating rod 20 utilizing handle 22 when the piston is in its topmost position. It will be appreciated by those skilled in the art that a plurality of such latch pins as seen in the FIGURE may be provided. All will pull through slot 24. Such a plurality provides for a plurality of stop positions for the piston 16, enabling various vacuum pressures to be selected for moving lighter or more delicate objects.

At the base of bore wall 14 in housing 12 the cylindrical bore communicates with a far smaller in diameter orifice 30 in a member 32. The orifice 30 is closable by a valve 34 having a handle 36. An adapter 38 is affixable to the lower end of member 32. The purpose of adaptor 38 is to provide a surface which will sealably engage a surface of an object or part to be picked up utilizing the vacuum produced within the cylinder of housing 12. Thus, a plurality of different adaptors for handling an assortment of parts may be releasably sealably connectable with the lower end of member 32. Those skilled in the art will appreciate that the adaptor may simply slide over the end of member 32, the inner diameter of its female fitting being tapered, and/or the male end of member 32 being tapered to provide a fairly vacuum-tight fit. Alternatively, adaptors may be threadably connectable to the end of member 32. A vacuum gage 40 may be operably connected to orifice 30 in member 32 or to bore wall 14 to provide the user of the instrument with an indication of vacuum present. An optional shield 42 may be utilized when hazardous material such as radioactive objects are being handled. The components of the device may comprise metal, hard plastic and other appropriate materials the suitability of which would be readily apparent to those skilled in the art.

To operate the preferred embodiment illustrated, a user closes the valve 34 with the piston assembly at the unextended position, fits an appropriate adaptor 38 to the end of member 32, withdraws the piston from an initial down cylinder position near where the optional shield 42 encircles the housing 12 to the topmost position shown in the FIGURE. The piston is latched in position by rotating the handle 22 so that the latch pin 23 rests on cap 26 after passing through slot 24 therein. As before mentioned, if a plurality of latch pins are provided, rod 20 is only pulled through as far as desired until a desired pin 23 passes through slot 24. The piston can be thereby positioned in a lower position at a user's option. The amount of vacuum made available by this action is readable by the user on gage 40. The adaptor is then positioned on a part or object 44 to be lifted, possibly transferred to another position or fitted on a device being constructed or the like. Valve 34 is then opened by the manual use of handle 36, expanding the vacuum within bore wall 14, which substantially evacuates whatever fluid media is in orifice 30 slightly lowering the vacuum shown on the gage, to the object. The resulting vacuum, which is almost the same as was initially available due to the low volume of orifice 30, is used to lift the object which is sealably engaged to adaptor 38.

Those skilled in the art will appreciate that the volume of fluid remaining in member 32 between the adaptor and the part must be kept small in comparison with the volume of the cylinder in housing 12 in order for sufficient vacuum to remain after the valve is opened to hold an object. The adaptor preferably has a soft surface or an O-ring type seal to provide a very good seal between the object and the adaptor. Relatively heavy parts, such as up to about six kilograms, can be readily lifted using this hand held portable device.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable those skilled in the art to best utilize the invention in various embodiments and with various modifications as are suited to the particular use contemplated. It is intended that the scope of the invention be defined by the claims appended hereto.

What is claimed is:

1. A hand held vacuum holding apparatus comprising:
    an elongated housing fittable in a user's hand comprising a generally cylindrical bore wall longitudinally disposed therein;
    a piston sealably and slidably engagable with said bore wall disposed therein;
    means for moving said piston reciprocally within said bore wall;
    means for locking said piston in at least one position;
    a piece engaging member communicating with said bore wall, said member comprising a conduit relatively small compared to said bore wall;
    valve means operably connected to said member for opening and sealing said conduit therein;
    a removable adapter sealably fittable with an object to be held communicating with said piece engaging member;
    a vacuum gauge communicating with said member for providing a reading of the vacuum present within said apparatus; and
    a radiation shield disposed about the housing for protecting a user's hand from radiation from an object being held.

2. The invention of claim 1 wherein said radiation shield is removable.

3. The invention of claim 1 wherein said radiation shield is a disk.

* * * * *